US009426345B1

(12) United States Patent
Turner, Jr. et al.

(10) Patent No.: US 9,426,345 B1
(45) Date of Patent: Aug. 23, 2016

(54) FLASH PHOTOGRAPH LIMITED FIELD BLOCKER

(71) Applicant: Applied Technologies USA, LLC, Monte Vista, CO (US)

(72) Inventors: Fred John Turner, Jr., Monte Visa, CO (US); Martin John Young, Crofton (GB); Frank Strazzabonsco, Erie, CO (US); James Dennis Vohlken, Frederick, CO (US); Michael L Rowley, Erie, CO (US)

(73) Assignee: Applied Technologies USA, LLC, Monte Vista, CO (US)

( * ) Notice: Subject to any disclaimer, the term of this patent is extended or adjusted under 35 U.S.C. 154(b) by 642 days.

(21) Appl. No.: 13/644,236

(22) Filed: Oct. 3, 2012

(51) Int. Cl.
*H04N 5/225* (2006.01)
*B60Q 1/56* (2006.01)
*G08B 13/18* (2006.01)
*G08B 13/181* (2006.01)
*G08B 13/189* (2006.01)

(52) U.S. Cl.
CPC .............. *H04N 5/2256* (2013.01); *B60Q 1/56* (2013.01); *G08B 13/18* (2013.01); *G08B 13/181* (2013.01); *G08B 13/189* (2013.01)

(58) Field of Classification Search
CPC .... B60Q 3/0293; B60Q 11/005; G08B 5/38; H05B 39/09; H05B 41/34; H05B 41/32; H05B 41/325
USPC .......... 315/77, 200 A, 241 P, 241 S; 340/331
See application file for complete search history.

(56) References Cited

U.S. PATENT DOCUMENTS

| | | | | |
|---|---|---|---|---|
| 5,095,252 A * | 3/1992 | Kurth | ...................... | H05B 41/34 315/200 A |
| 6,111,364 A * | 8/2000 | Davis | ................... | G08G 1/0175 315/159 |
| 6,351,208 B1 | 2/2002 | Kaszczak | | |
| 6,937,163 B2 | 8/2005 | Caulfield et al. | | |
| 7,006,923 B1 * | 2/2006 | Rubin | ................ | G01N 15/1463 702/19 |
| 2005/0093684 A1 * | 5/2005 | Cunnien | .............. | B60Q 1/0023 340/435 |
| 2006/0212196 A1 * | 9/2006 | Davidson | ............... | G01C 21/26 701/36 |
| 2007/0103552 A1 * | 5/2007 | Patel | ...................... | H04N 5/913 348/203 |
| 2009/0156900 A1 * | 6/2009 | Robertson | .......... | A61B 1/00009 600/160 |
| 2012/0056546 A1 * | 3/2012 | Harvey | .............. | H05B 37/0227 315/159 |
| 2012/0141104 A1 * | 6/2012 | DeLuca | ................... | G03B 7/08 396/158 |
| 2012/0256541 A1 * | 10/2012 | Dandrow | ........................ | 315/77 |
| 2014/0241716 A1 * | 8/2014 | Bradley | ........................ | 398/39 |

* cited by examiner

*Primary Examiner* — Mohammed Rahaman
*Assistant Examiner* — Jimmy S Lee
(74) *Attorney, Agent, or Firm* — Santangelo Law Offices, P.C.

(57) ABSTRACT

An intruding flash is detected by a light detector in a plastic case that may be mounted adjacent to a license plate or window which is made safe from the intruding camera. The flash detector triggers a counteracting light flash. The case and electrical PC board have reflectors to capture lost light, guiding direct and indirect light to the desired surface area, increasing the invention's counteracting flash over the "target" area protected from an intruder camera. The counteracting flash is not directed at the intruding camera to blind the entire camera lens and field of view as with previous art. Instead the counter flash is directed about perpendicular to the incoming angle of the intruding flash, over exposing only that surface area within the intruder camera's full field of view to be protected from photography, preventing only that portion of the intruder camera's field of view from being imaged.

19 Claims, 10 Drawing Sheets

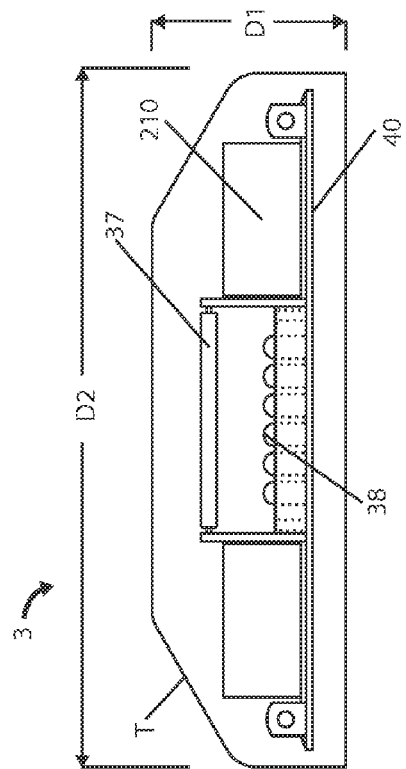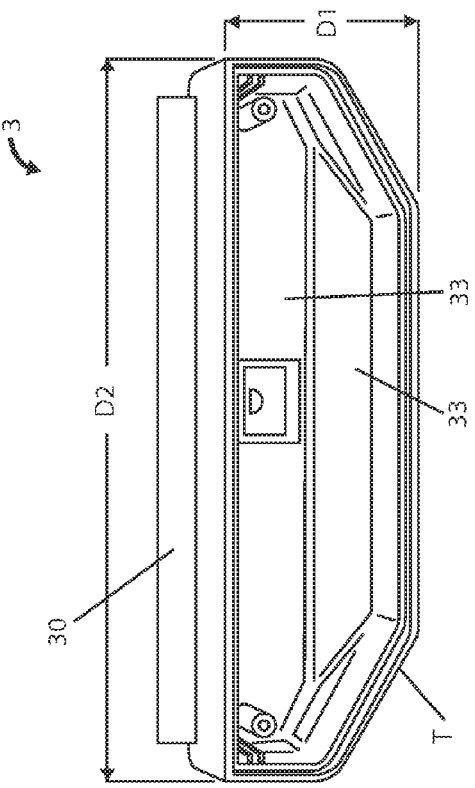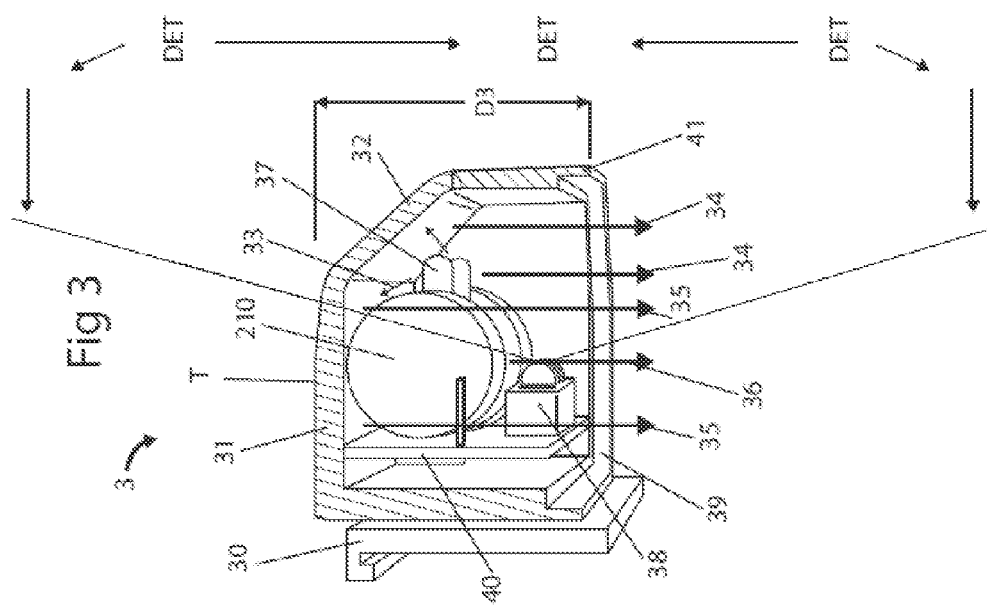

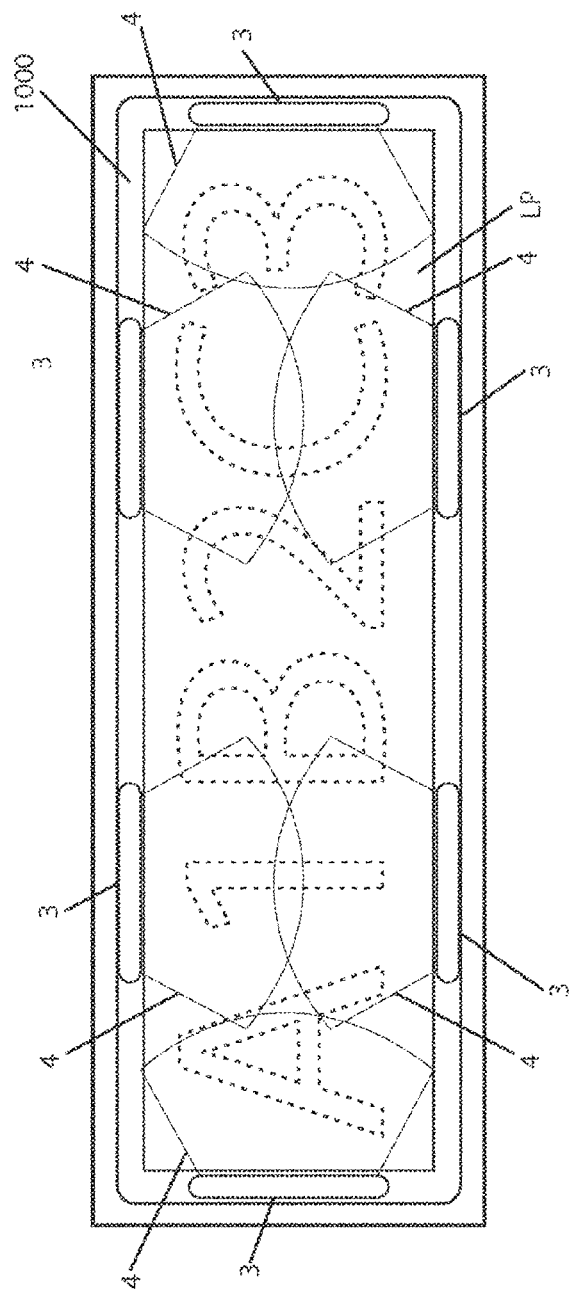

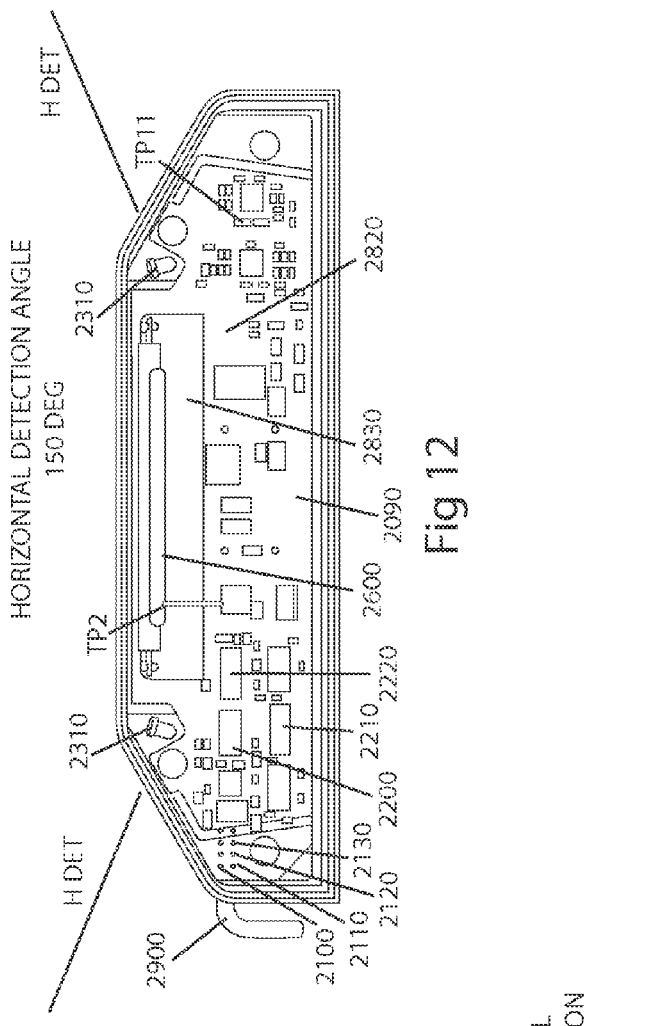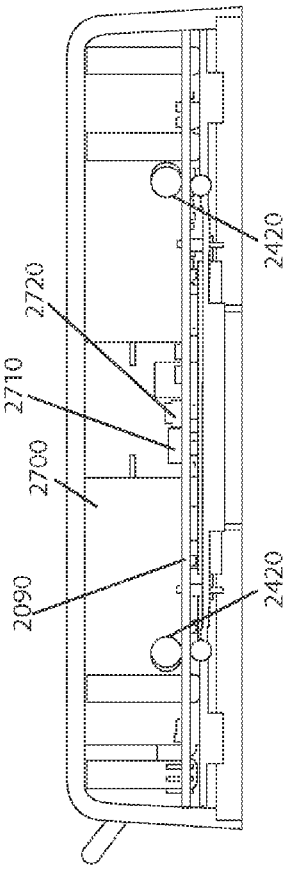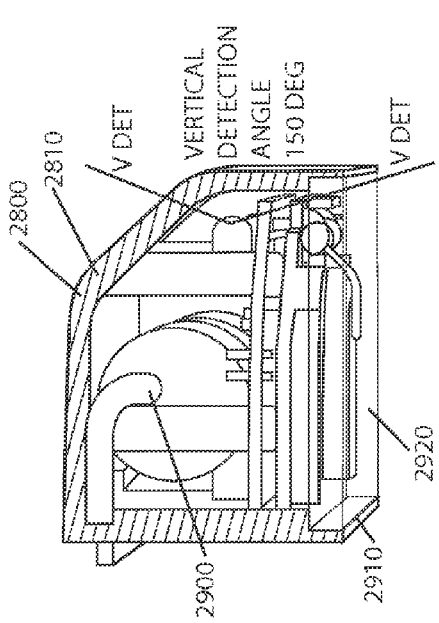

FLASH PHOTOGRAPH LIMITED FIELD BLOCKER

CROSS REFERENCES PATENTS

This is a non-provisional application claiming priority from provisional application Ser. No. 61/544,161 filed Oct. 6, 2011.

FIELD OF INVENTION

The present invention relates to sensing any number of intruder camera flashes and instantly directing any number of infrared or white light counter flashes, perpendicular to the plane of the intruder camera flash, over a limited field of view of the intruding camera's total field of view, thereby preventing a picture of a limited field of view within the camera's full field of view, which could be but not limited to a license plate, ID Tag, vehicle window, home window or business window in all references as to where the technology would be used.

BACKGROUND OF THE INVENTION

The famed paparazzi, information thieves and the dreaded traffic control cameras use flash cameras. Prior art systems are known to sense the intruder's flash and then send a counter flash right back toward the intruder's camera lenses, thereby preventing the complete image by blinding the lens with some form of light, whiting out the entire picture, of the intruder camera that may have been taken.

U.S. Pat. No. 6,351,208 (2002) to Kaszckak discloses an ultraviolet laser emitter which defeats the entire picture of the automatic traffic control camera. The laser gun shoots straight out from its housing back into the intruder camera lens. A flash detector triggers the laser gun.

U.S. Pat. No. 6,937,163 (2005) to Caulfield et al. discloses a flash detector which triggers a counteracting flash with a time delay of 100 micro-seconds (0.000100 seconds) after detecting the intruder's flash. The apparatus saturates the entire area of the intruding camera's image field by directing the counteracting flash directly at the intruding camera.

The disadvantages of these systems are several. Nearly all cameras in use today are digital cameras with some form of high speed image detection, such as Charge Coupled Devices (CCDs). The typical response time of a digital camera from flash to detection is about ten micro seconds of time to acquire the incoming image. Thus a digital intruder camera could flash and acquire the desired image before a 100 microsecond delay had elapsed, making it difficult for a 100 micro second delayed counterflash to prevent a digital image by an intruder camera operating at about 10 micro seconds of response time. Disadvantages also include flashing back at the intruder camera which temporarily blinds the intruding cameraman, a person near him or vehicle driver, as well as blinding the entire intruder camera's field of view. In addition, laser energy from a laser beam is invisible and has the potential of causing eye damage if a person's eye was in line with the emitted laser energy. This temporary blinding is a surprise blinding. This surprise could result in an accident such as stepping in front of a moving vehicle, losing control of a vehicle or eye damage.

What is needed in the art is a limited field for a counteracting flash with no surprise flash aimed at the intruding camera, other people or vehicle drivers. The present invention solves this need with counteracting flashes aimed perpendicular to the intruding camera flashes. A special housing prevents the counteracting flash from reaching the intruding camera flash and focuses by reflectors the counteracting flash over a limited protected area to be protected from an intruder camera's full field of view, such as a license plate, ID tag, home window or business window in all references as to where the technology would be used. Thus, the intruder camera operation is not affected while simultaneously preventing only a desired limited area within the intruder camera's field of view from being imaged, by over exposing only the limited area in normal light wavelengths and reverse wavelengths, which are called negatives.

SUMMARY OF THE INVENTION

The primary aspect of the present invention is to provide immediate high intensity counteracting flashes of white light or infrared light after one or more intruder camera flash detections, with no delay after intruder camera flash detection, over a limited target within the intruder camera's field of view.

Another aspect of the present invention is to limit counteracting flashes from reaching the intruding camera by not flashing back at the intruder camera and directing the counteracting flashes about perpendicular to any incoming intruding camera flash.

Another aspect of the present invention is to use the counteracting flash to prevent an unsolicited image of a local area within the intruder camera's full field of view, rather than to direct light back into the intruder camera lens to white out the entire intruder camera's field of view, thereby not blinding the intruder camera's full field of view, nor blinding possible nearby people or possible nearby drivers.

Another aspect of the present invention is to use the counteracting flash to prevent the extraction of digital information from a negative of the image of the local area within the intruder camera's full field view.

Another aspect of the present invention is to provide a high voltage, high speed, switch network, provide one or more high voltage charge devices operating between zero volts DC (0 Vdc) and any desired high voltage and provide one (1) or more high voltage storage devices; such that when a high voltage storage device discharges its voltage to the counter flash device, the high voltage, high speed, switch network switches to another high voltage storage device, while the last high voltage storage device is recharged from one or more of the high voltage charge devices of the present invention.

Another aspect of the present invention is to provide the capability to switch between modes of operation, such as but not limited to Mode 1) low intensity illuminations only, Mode 2) flash detection and flash alert, and Mode 3) flash detection, flash alert and counter flash response.

Another aspect of the present invention is to provide an enclosure that is transparent to infrared light and white light while simultaneously blocking UV light.

Another aspect of the present invention is to provide light reflectors to guide lost light of the counter flash to the desired area to be exposed with counter flash.

Another aspect of the present invention is to provide full control of the intensity of the light source.

Another aspect of the present invention is to minimize or prevent false electrical flash detection from, such as but not limited to, electromagnetic RFI pulses, DC voltage changes, slow rise time flashes, repetitive flashes from non-camera sources.

Other aspects of this invention will appear from the following description and appended claims, reference being made to the accompanying drawings forming a part of this specification wherein like reference characters designate corresponding parts in the several views.

A plastic case can be hung over, under or to the side of, such as but not limited to, a license plate, vehicle window, home window of business window in all references as to where the technology would be used. The front of the case has a transparent window to let in the intruding camera flash to a sensor. The window rejects UV light detections. The sensor immediately generates an electrical trigger to fire a counteracting flash with a white light, or infrared light source. The walls of the case have internal reflectors to reflect the white light, LED, flash bulb or infrared light as does the PC board. Thus, a guided beam of direct and reflected light, which is about perpendicular to the incoming intruder camera flash, envelops the target to defeat a photograph of the target within the intruding camera's full field of view.

DC power is provided from an AC to DC source, DC to DC source, AC to AC source, a solar to DC source or a battery source to the invention power input, providing active circuit operation (detect and flash) or passive circuit operation where only light illumination is provided to the target; or power off. The enclosure allows for infrared and white light to be detected through the enclosure, while also providing an internal reflective wall to guide light to the desired area of target. The enclosure is designed such that it detects infrared light and white light across a broad 150 degree horizontal pattern and a broad 150 degree vertical pattern. Simultaneously, the enclosure blocks UV light from passing through the top of the enclosure, where light is guided downward to the desired area of interest. The electrical components board is installed with the appropriate electronic and mechanical components to detect a camera flash, illuminate the area of the target and provide power to the electrical components, while holding the electronics board into the enclosure with appropriate hardware, and sealing the electronics from external weather using common water seal methods of epoxy and solvent cement, or any other method to achieve isolation from external environmental factors. The invention provides the necessary DC POWER using a common external 12 volt nominal source. 12V input provides power to LED illumination only for low intensity lighting to the local area of the target; or 12V input can provide power only to the detection and alert circuitry to detect and alert when a photographic device tries to acquire the target; or 12V input can be selected to provide power to the entire detection, trigger, flash and alert circuitry to detect when a photographic device tries to acquire the target, responding by over exposing the area of the target only, while not directing light to the camera so as to blind the entire camera's field of view. Flash detection IR and white light detect can use one infrared light detector, but to improve performance, the apparatus can use more than one Infrared light detector to improve flash detection in low, medium and high levels of background light, at a distance of less than one foot (1) to more than six hundred (600) feet. Once a photographic device light flash is detected, the pulse is processed thru a rise time filter. If a slow rise time pulse is detected, indicating a false camera flash, it is blocked. The fast rise time filter reduces false triggers, while passing fast rise time, photographic device flashes. The detected flash is converted to a trigger in the trigger circuit, generating a digital signal. Electrical DC change filter circuit techniques are employed to prevent a power on/off cycle from generating a false trigger. The Trigger is additionally filtered by a radio frequency (RFI) filter to minimize false triggers and reduce false alerts. The trigger circuit also incorporates a repetitive flash filter, which filters out repetitive flashes, such as, but not limited to fork truck warning lights. The Trigger is used to fire a white or infrared light source, producing a counter flash. The circuit time from detection to light illumination is much less than 85 microseconds (0.000085 seconds) which is faster than other technology. A "power off discharge" circuit provides a discharge path for the storage voltage devices when power is turned off, providing a safe electrical discharge path to ground to minimize electrical shock. Two or more high voltage, storage devices are charged up from ground to a desired, high voltage using various types of transformers.

One or more storage voltage devices are connected electrically to the light source at a time. When a trigger fires the light source, the high speed switching network immediately switches to another high voltage, storage device, so that one or more voltage storage devices are always electrically connected to the light source.

The trigger circuit also sends a signal to a remote LED circuit and a remote audio circuit to generate a signal for an external LED and buzzer alert device. The connect sense signal is available to an external device, indicating the apparatus is connected to an external device.

The enclosure is designed with the following mechanical advantages:
1) polycarbonate enclosure with infrared transmission of 90% or more while suppressing shorter UV wavelengths from passing thru the polycarbonate;
2) upper, inner enclosure using a reflective material;
3) non-transparent, upper enclosure surface prevents light from escaping the enclosure top;
4) reflective surfaces to guide internal light flash to a desired area of the target;
5) a 150 vertical degree angle and 150 horizontal degree of flash detection through lower transparent walls.

The enclosure is designed to pass infrared light thru the lower front, lower left and lower right enclosure at a vertical angle of plus/minus 75 degrees up and down, about 150 degrees, and a horizontal angle of plus/minus 75 degrees left and right, about 150 degrees. The enclosure material blocks UV light from entering the enclosure, thus reducing false UV light triggers. The enclosure is also designed to block light from escaping through the inside upper enclosure. This is accomplished by roughing the external surface and applying internal reflectors. The top, inner enclosure walls are lined with a reflective material such as but not limited to aluminum tape, mylar tape or any form of reflective material to catch lost light, thereby doubling the amount of light guided to the target to be protected from an image near the invention, typically, but not limited to 30 inches distant. The reflective adhesive material is required to adhere in a temperature range of −40 F to +200 F. Alternatively, metal deposition or high reflective paints can be applied to the top inner enclosure walls for reflectivity. The enclosure lid passes white light, UV light and infrared light to the desired area of the target near the invention, typically, but not limited to, 30 inches distant.

Power, infrared detection, trigger, filtering, SCR, transformers, white light generator, high voltage storage devices are all required for the invention to function as designed in its present embodiment. In addition, the enclosure must include infrared light passing capabilities, UV light blocking capabilities, reflector, light guiding walls, and water seal. It is possible to use components, such as but not limited to batteries, capacitors, inductors and solar power circuits to replace the high voltage storage devices. It is possible to use high voltage charge devices such as but not limited to a traditional wired transformer, albeit large and bulky, inductors and coils to replace the surface mount, charge transformer. It is possible to use a variety of light sources such as but not limited to high intensity Light Emitting Diodes (LEDs), infrared diodes, infrared lights, white lights or flash tubes at various wavelengths to illuminate the target area near the invention. It is feasible to vary the operating trigger response to decrease flash response time well below one (1) microsecond (0.000001 seconds) in time. It is possible to use o'rings or various weather tight seals to isolate the electrical components inside from weather outside the enclosure. It is possible to use a variety of electronic components to provide the same electrical functions of light detection, trigger filter, trigger, SCR, transformers and light source.

The light detecting photo diodes must be located at the proper height to ensure proper flash detection from an external flash. The invention is produced by providing infrared LED detectors, semiconductor process chips, resistors, capacitors, etc., transformers, SCR, illumination device, high voltage, storage devices, electronics PC board, solder, mechanical assembly of PC board, infrared transparent enclosure, inner reflectors, assembly of power cable, enclosure and lid combined with water tight fittings. The illumination device must be located at a point near the inner reflector, adjusted as required to achieve optimal light guidance to the area of the target near the invention. High voltage connections on the PC board must be located safely away from other components to prevent high voltage arcing. The power cable and lid must be installed as water tight fittings. The unit is tested for Mode 1 LED Illumination only, Mode 2 LED Illumination plus Intruder Camera Flash detection and alert, and Mode 3 LED Illumination plus Intruder Camera Flash Detection and Alert plus Counter Flash operation, observing flash detection, flash response, and alert outputs and light illumination. The PC Board and Reflector may be bolted, clipped or glued into location to maintain position during life of product.

The components must be installed as designed to achieve the desired results. As new components become available with improved performance, the newer components can be substituted for old components to improve reliability of the invention. The invention could be installed near windows of any location where images may be taken through a window or around buildings to image a person's face, an object or information to prevent unsolicited images of the target within a camera's field of view. The invention could be installed on vehicle windows where images may be taken through the window of a vehicle to image a person's face, an object or information to prevent unsolicited images of the target within a camera's field of view. The invention could be installed near or on a license plate or near a windshield security pass or bumper security pass to prevent unsolicited images of the target within a camera's field of view. Power can be applied to either the Mode 3 detect/flash/alert circuit and the circuit responds automatically. Power can be applied to the Mode 2 detect/alert circuit and the circuit responds automatically. Or power is applied to only the Mode 1 "illumination only" circuit simultaneously, or power is turned off.

The invention can be used in any application where it is desired to prevent an image of a desired target while not blinding the intruding camera's field of view. A summary of the invention follows below.

1. An apparatus using an illumination device to over expose a surface area with light, located about 90 degrees to the plane of the intruder camera's field of view; thereby preventing an unsolicited image of the area of interest to be over exposed within an intruder camera's full field of view, such as an object or person behind a window, or license plate, while not interfering with the intruder camera;

2. An apparatus with flash detection circuitry and flash response providing less than 85 microseconds (0.000085 seconds) response time between the flash detection and flash response by choice of electronic circuitry;

3. An apparatus providing two methods of light emission, direct light emission and indirect, flash guided light emission, whereby direct light flashes directly to the area of interest to be over exposed; and indirect light that is captured and redirected, through use of any reflective surface such as but not limited to aluminum tape, silver paint, silver mylar tape or deposited film, to the area of interest to be over exposed, thus significantly increasing the amount of light energy on the area of interest to be over exposed;

4. An apparatus using sufficient level of light to prevent extraction of the digital image data through the use of computer software color wavelength inversion or creating a negative of the data of the protected area of interest within a camera's field of view;

5. An apparatus using proper electronic components to switch back and forth between two or more voltage storage devices; such that when one of the storage devices discharges its voltage, the high speed, high voltage switching network switches to another high voltage storage device, ready for the next flash, providing two or more flashes in quick succession, while the last storage device recharges from one or more high voltage charge devices.

6. An apparatus providing transparent, highly polished inner/outer surface, allowing white and infrared light wavelengths to pass through the polished portion of the enclosure, while simultaneously blocking UV light thru the enclosure.

7. An apparatus providing the capability to switch modes of operation between 1) low intensity illumination only, 2) flash detection with flash alert or 3) flash detection, flash alert and counter flash response.

8. An apparatus providing full control of the intensity of the counter flash source.

9. An apparatus that minimizes or prevents false electrical flash detection from, such as but not limited to, electromagnetic RFI pulses, DC voltage changes, slow rise time flashes, repetitive flashes from non-camera sources.

10. An apparatus using multiple charge devices, such as but not limited to inductors and transformers, which can be located on the electrical PC board of the invention or located externally off the invention's electrical PC board.

11. An apparatus using multiple charge storage devices, which can be but is not limited to batteries and capacitors, which can be located on the electrical PC board of the invention or located externally off the invention's electrical PC board.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

BRIEF DESCRIPTION OF THE DRAWINGS

FIG. 3 is a sectional end view of the image preventer.

FIG. 4 is a top plan view of the image preventer with the top removed.

FIG. 5 is a bottom perspective view of the top of the image preventer.

FIG. 10 is a front elevation view of a picture frame embodiment surrounding a license plate.

FIG. 11 is a sectional end view of the multi-flash embodiment.

FIG. 12 is a bottom plan view of the multi-flash embodiment with the top removed.

FIG. 13 is a front elevation view of the top of the multi-flash embodiment.

DETAILED DESCRIPTION OF THE DRAWINGS

Figure 1:
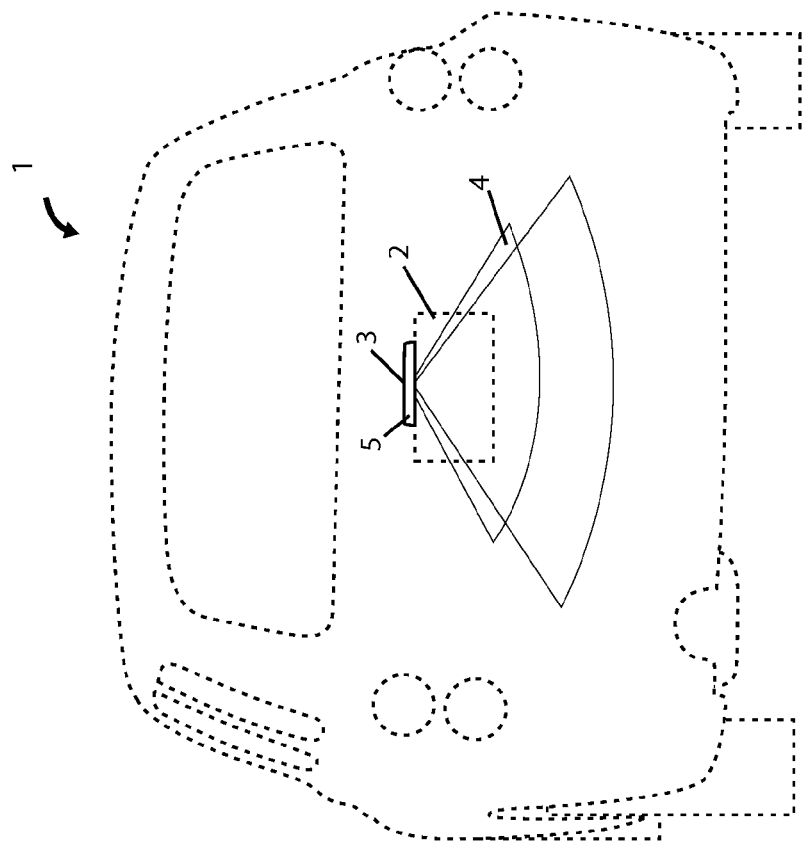
FIG. 1 is a front perspective view of the image preventer mounted over a license plate on or over a business window, home window or car window.

Referring first to FIG. 1 a car 1 has a license plate 2. A photo defeater 3 has been mounted above the license plate 2. The photo defeater (also called photo preventer) 3 has detected an intruding flash through its front face 5. The circuitry in the photo defeater 3 has triggered a counteracting flash about 90 degrees or about perpendicular to the incoming intruder camera flash angle, over the license plate 2 as shown by white out area 4.

Figure 2:
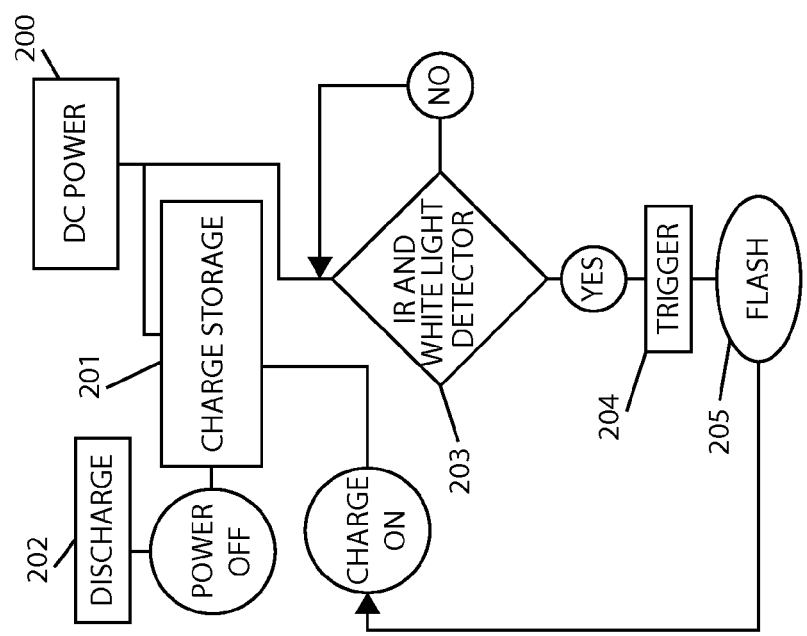
FIG. 2 is a flowchart of the image preventer's logic cycle.

Referring next to FIG. 2 the power 200 powers the light energy storage device 201 which can be discharged at 202 when the system is off. When the intruder camera flash unit 203 is activated, then it fires the trigger 204 which discharges the energy storage device energy from 201 to the flash 205.

Figure 7A:
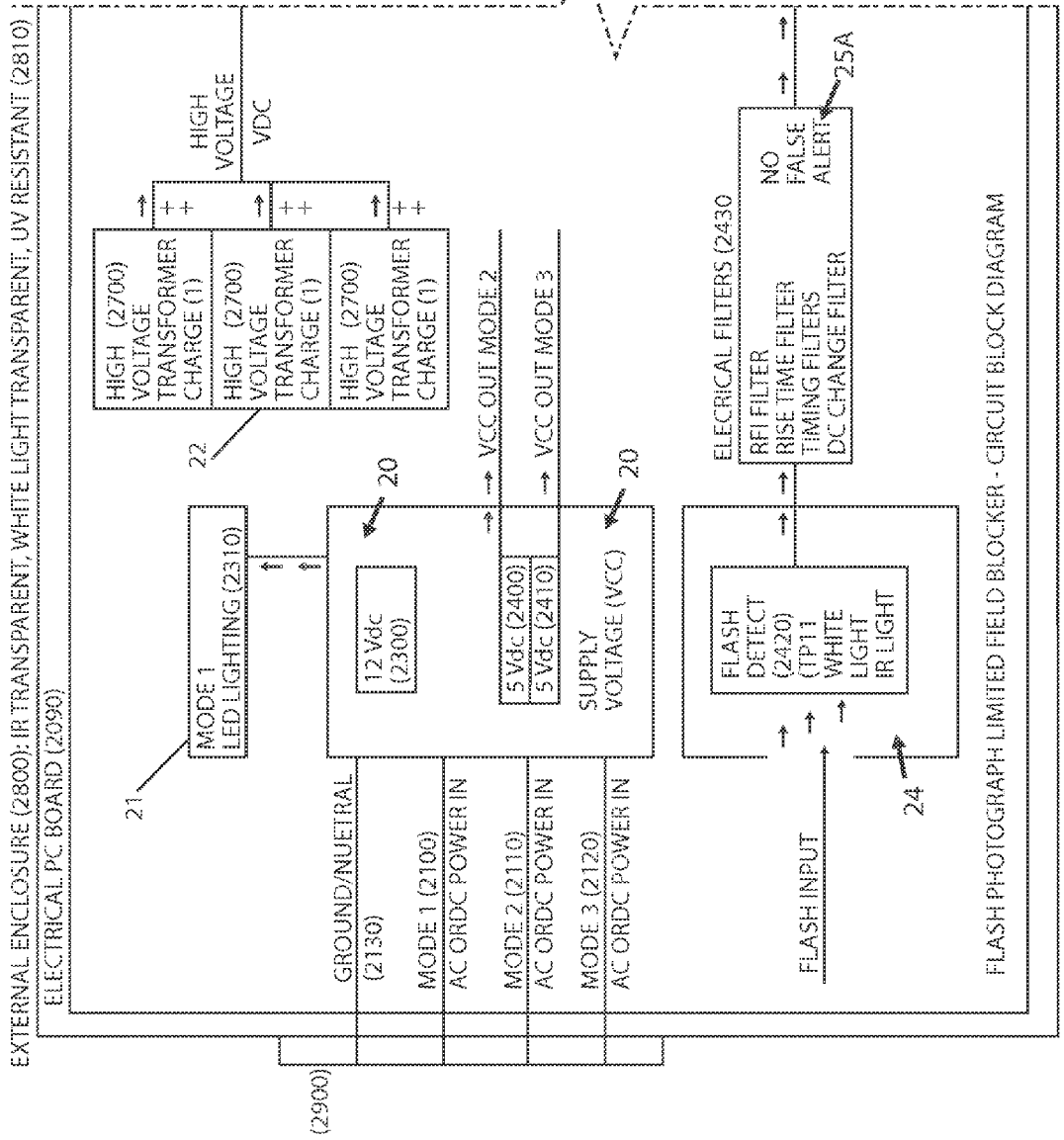
FIGS. 7A, 7B are a schematic drawing of the system logic.
Figure 7B:
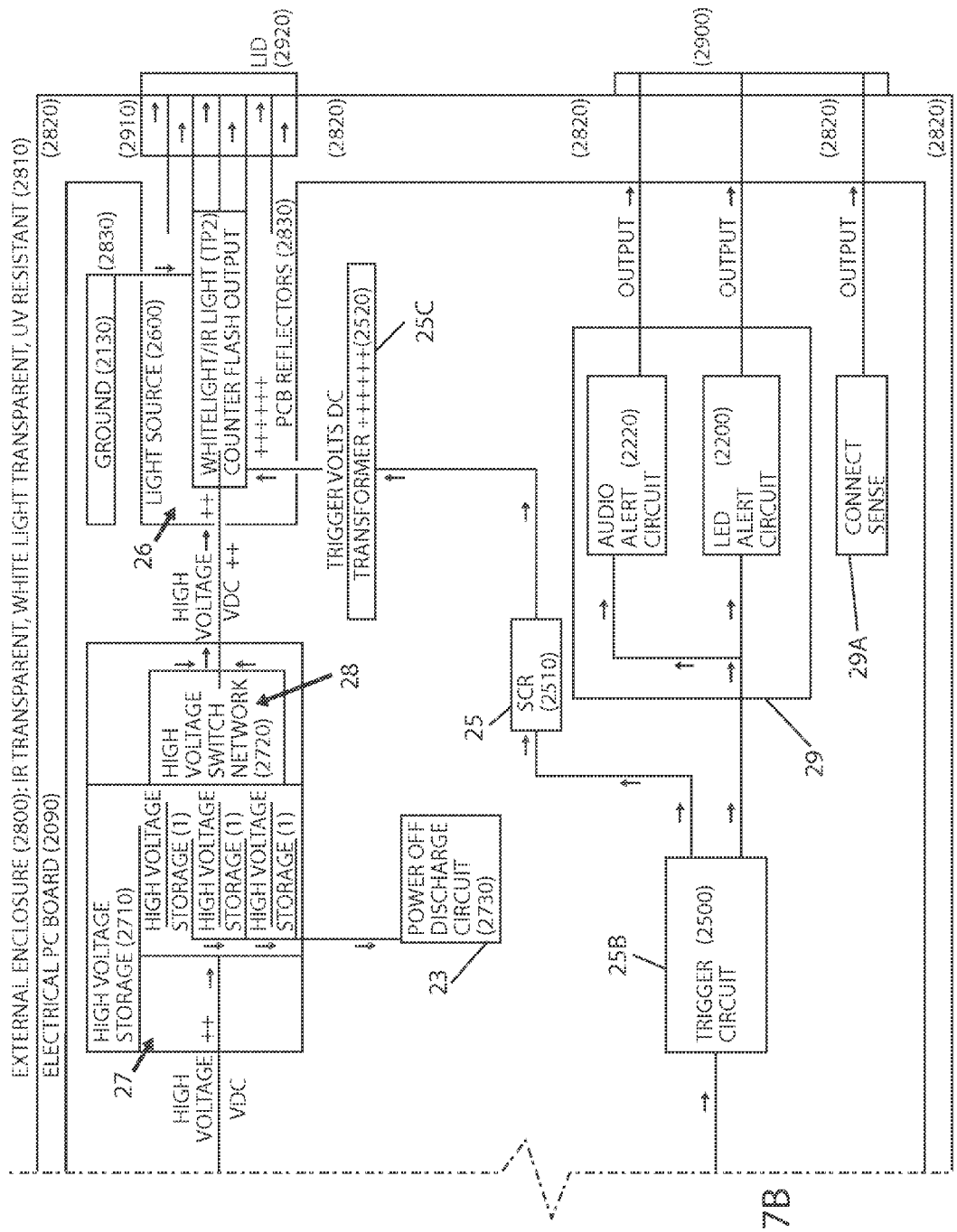

Referring next to FIGS. 7A, 7B a basic schematic of the system flow is shown. DC power is received at 20. An auxiliary target LED light 21 is switched on or off. One or more transformer voltage chargers 22 are powered, charging one or more storage voltage devices 27 to the desired voltage. If the system is shut off, then the storage voltage devices 27 are discharged at 23. An infrared and white light detector 24 detects the intruder camera flash, and the output signal is filtered to remove false alerts at 25A. The filtered output generates a trigger at 25B, which is used to create alert outputs at 29 while simultaneously generating a SCR pulse 25, which charges a transformer 25C, which discharges the light source 26.

Figure 9:
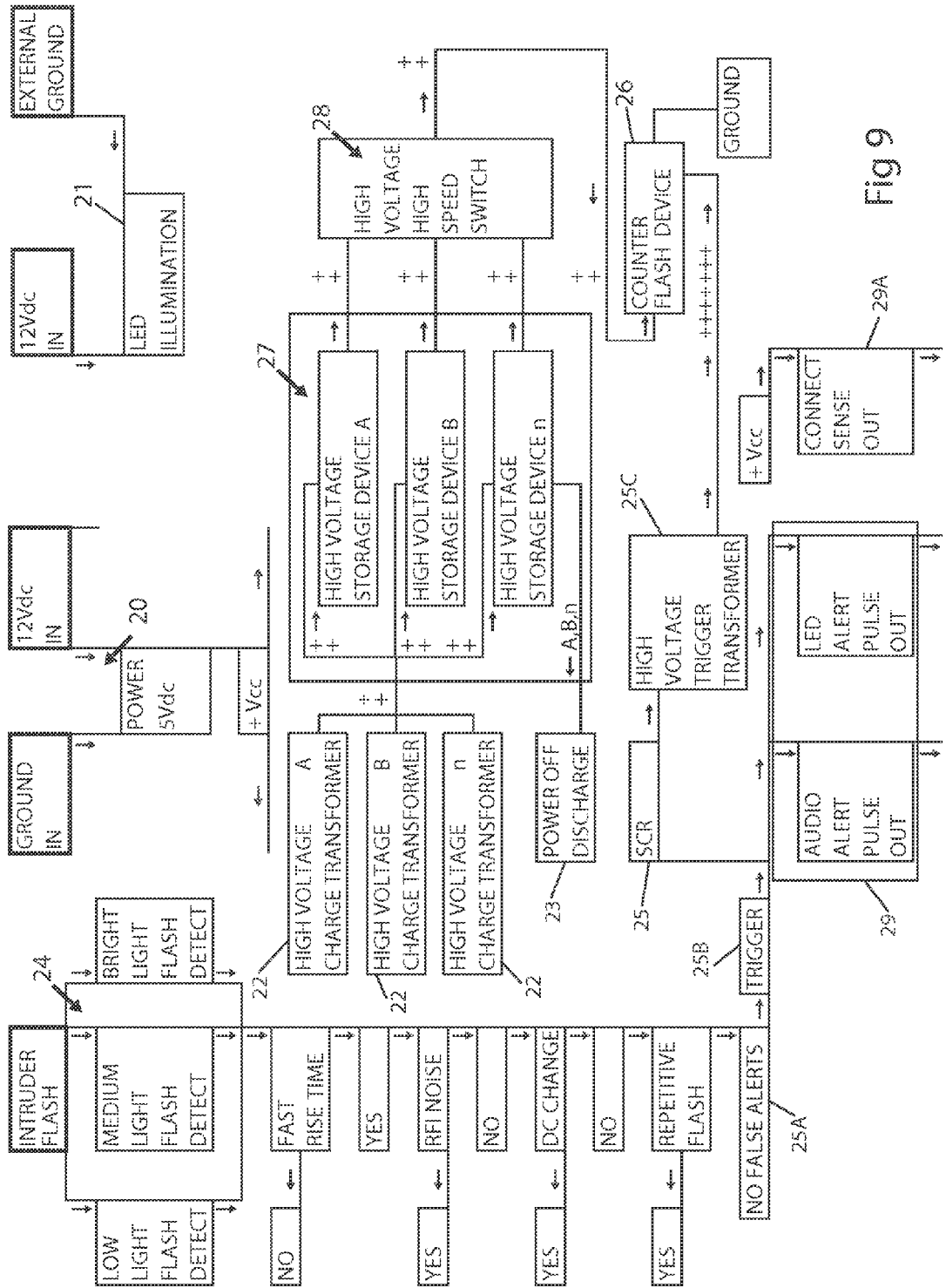
FIG. 9 is a flowchart of a second embodiment, multi-flash, image preventer.

Referring to FIG. 9 logic chart, power 20 is provided to transformer voltage chargers 22, which charge up one or more storage voltage devices 27 which applies a high voltage charge to the light source 26. If the system is shut off, then the storage voltage devices 27 are discharged at 23. If the infrared and white light detector 24 senses an intruder camera flash at yes, and verifies no false alerts at 25A, then trigger 25B is generated to create an alert output 29 while simultaneously generating an SCR pulse 25. SCR pulse 25 charges a transformer 25C to instantly fire a high voltage charge from one of the storage voltage devices 27 across the light source 26 to ground, creating the desired counter flash when detecting an intruder camera flash, while recharging the storage voltage device 27 that just discharged from one or more transformer voltage chargers 22, while the high speed switching network switches to another storage voltage device 27, making the circuit instantly ready to detect another intruder camera flash at 24. Connect sense 29A is a constant output to an external circuit.

Figure 14:
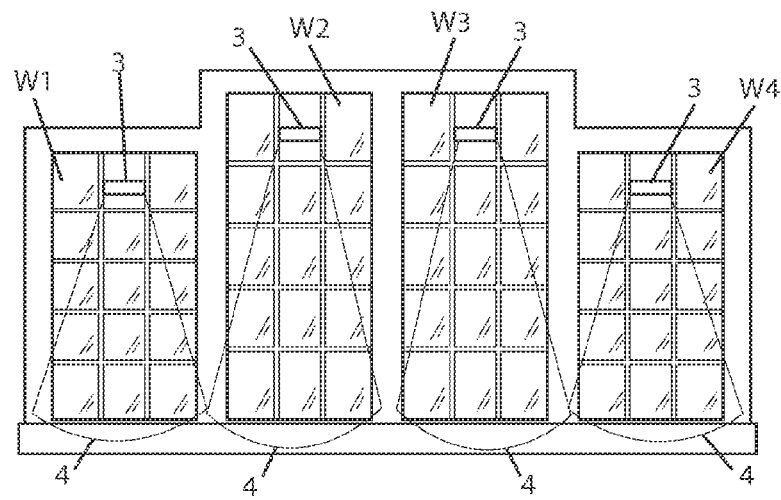
FIG. 14 is a side elevation view of a car having the image preventer on each side window.
Figure 15:
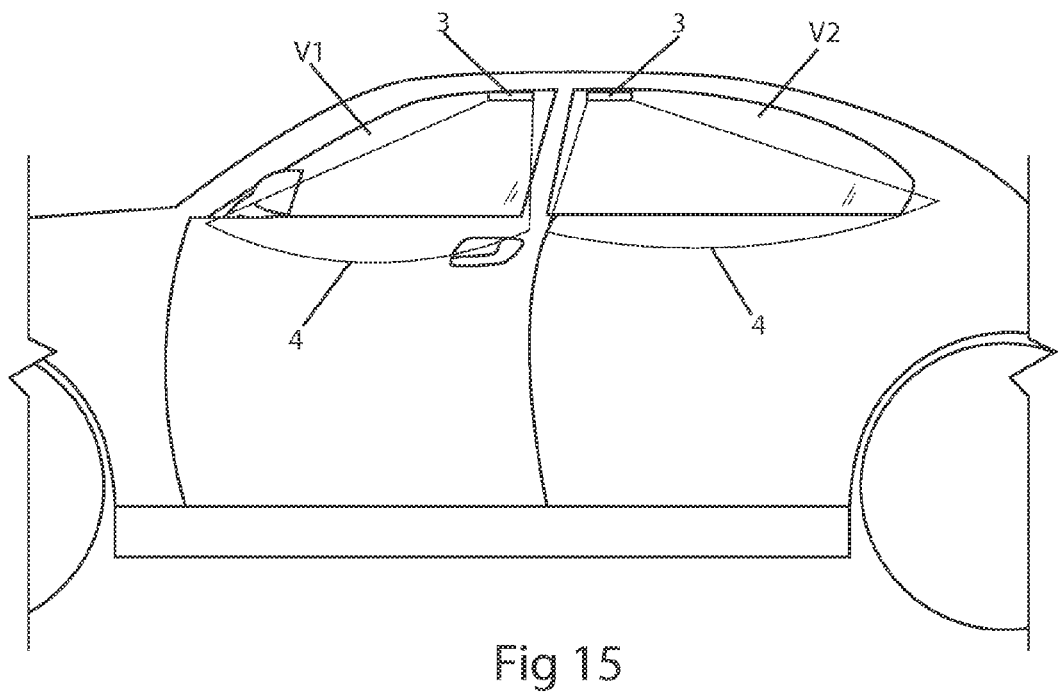
FIG. 15 is a front elevation view of a window of a building having image preventers.

Referring next to FIGS. 3, 4, 5 the photo defeater 3 is shown to have a mounting hook 30 for case 31. Referring to FIGS. 14 and 15, the photo defeater 3 could also be mounted above or on a home window, W1-W4 business window or vehicle window V1, V2. Referring to FIG. 10, the photo defeater 1000 could be mounted on or over a license plate LP. Photo defeater 1000 consists of a picture frame design with multiple defeaters 3.

Referring to FIGS. 3, 4, 5, the rear and upper and front angled segments shown in crosshatch 32 are opaque. The inside top and inside angled segments 33 are coated with a reflective material, or a physical reflector is mounted inside the enclosure. Thus, when infrared or white light 37 fires, direct light 36 passes through the transparent bottom 39. Additionally, reflected light 34 and 35 passes out the bottom to amplify the flash. The white light and IR light detectors 38 and all electronic are controlled by the PC board 40. The front wall 41 is transparent to let in the IR light for sensors 38. The detection angle DET is about 75 degrees forward and 75 degrees downward, about 150 degrees in the vertical plane; while the horizontal detection angle (HDET) FIG. 12 of the intruder flash is about 75 degrees to the left and 75 degrees to the right of center, about 150 degrees in the horizontal plane.

The top T FIG. 3 may be made as an opaque polycarbonate with a UV block. D1 is about 1.5 inch and D2 is about 6 inches. White light or infrared light 37 can be a three inch or less xenon lamp or infrared lamp. D3 can be about 1.25 inches or less.

Figure 6:
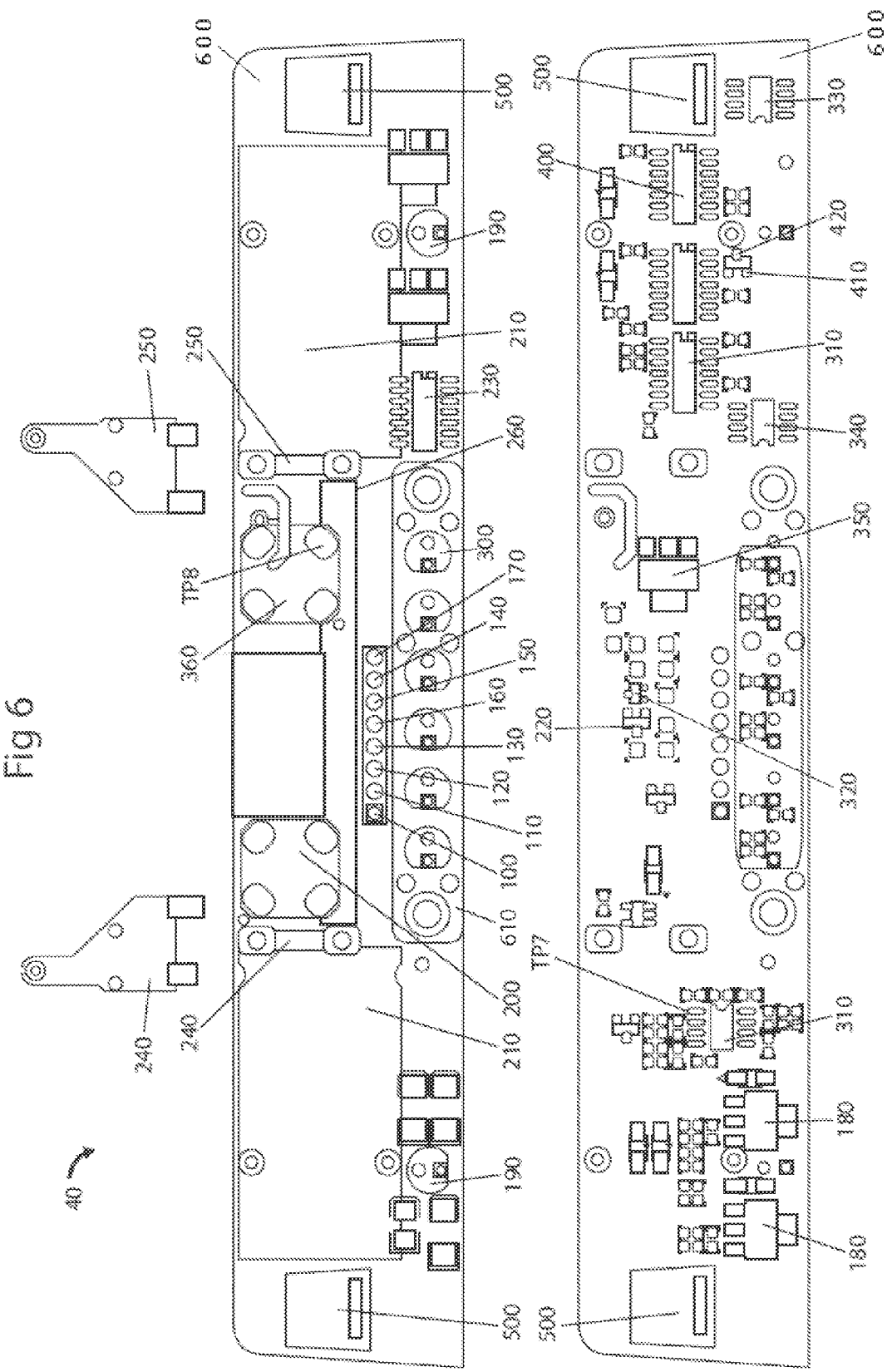
FIG. 6 is a top plan view of the circuit board of the image preventer.

FIG. 6 shows the PC board 40 with the following components listed:
- 100: Mode I, DC Power in, 12 Vdc, J1-1
- 110: Mode I Ground, J1-2
- 120: Mode II, DC Power in, 12 Vdc, J1-3
- 130: Ground In, J1-4
- 140: Led Alert Out, J1-5
- 150: Ground In, J1-6
- 160: LED Alert Out, J1-7
- 170: Connect Sense Out, J1-8
- 180: DC Power, Vcc: 5 Vdc, 12 Vdc
- 190: Mode I, LED Lighting
- 200: Transformer Voltage Charger
- 210: Storage Voltage Device
- 220: Power Off Discharge
- 230: High Speed, High Voltage Switching Network
- 240: Daughterboard 2
- 250: Daughterboard 1
- 260: Circuit Flash Tube
- 300: IR Flash Detection Circuit
- 310: Rise Time Trigger Filter
- 320: Trigger Circuit
- 330: Repetitive Flash Filter
- 340: DC Change Trigger Filter
- 350: SCR Trigger
- 360: SMT Transformer Trigger
- 400: Remote Audio Circuit
- 410: Connect Sense
- 420: Remote Led Circuit
- TP7: Input Detector Flash Time Reference
- TP8: Output Trigger Pulse
- 500: Circuit Board Brackets 600: Reflector White
610: Reflector Silver Referring to FIGS. 11, 12, 13 another layout is shown with the following components listed:

2090: PC Board with Electronic Components
2100: Mode I, Power in,
2110: Mode II, Power in,
2120: Mode III, Power in
2130: Ground and/or Neutral In
2200, 2220, 2210: Led Alert & Audio Alert circuits, Connect Sense Out
2310: Mode I, LED Illumination
2420: Infrared Light and White Light Detector
2600: White Light or Infrared Light Flash Device
2700: High Voltage Storage Devices, 1 to n
2710, High Voltage Charge Devices, 1 to n
2720: High Voltage Switching Network
2800: External Enclosure
2810: UV Resistant Enclosure
2820: White Reflector
2830: Silver Reflector
2900: Water Resistant, Power Cable in,
2910: Weather Tight Seal
2920: Transparent Lid
TP11: Input Detector Flash Time Reference
TP2: Output Counter Flash
V Det: Vertical Detection Angle, 150 degrees
H Det: Horizontal Detection Angle, 150 degrees Referring next to FIGS. 7A, 7B a more detailed schematic is shown using the nomenclature from the PC board of FIG. 6 combined with the flowchart nomenclature of FIG. 9.

Remote Audio is an electrical output to an external device, which may or may not be connected at customer discretion. This serves two purposes of
1) keeping the present technology as small as possible and
2) allowing the user to use or not use an audio alert.

Connect sense is an electrical output to an external device, which allows the external device to recognize a photo device is connected to the external device and can be alerted to connection to the external device user.

Rise time trigger filter has the purpose of filtering out slow transition light reflections. When passing a telephone pole in bright sunlight, the transition of bright light to shadow to bright light can induce a false trigger and false alert. We refer to these types of triggers as slow rise time triggers, such as telephone pole, trees, corners of buildings, roadside objects, etc. The rise time of these light transitions ate relatively slow compared to photo flash light transition; therefore the fast rise time filter passes only a fast trigger rise time, thus filtering out nearly all false triggers induced by non-photo light transitions.

Figure 8:
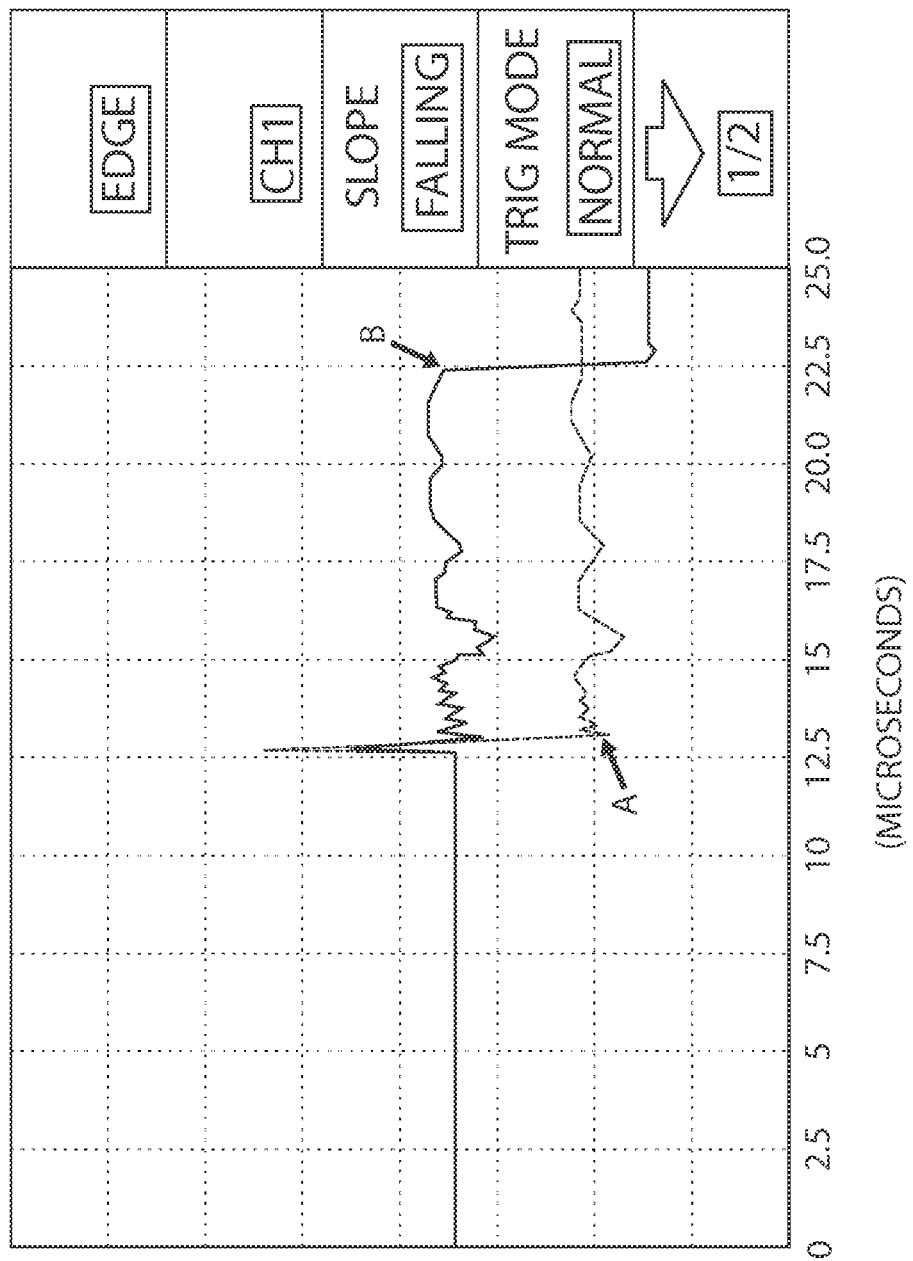
FIG. 8 is a graph showing a ten microsecond span from the detection of the intruder flash to the counteracting flash.

Referring next to FIG. 8 the intruder flash is sensed at A. The counteracting flash is triggered at B, showing a ten microsecond lapse of time.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

We claim:

1. A photo preventer comprising:
   a housing having an intruder light flash detector which will generate a counter flash when detecting the intruder light flash;
   a flash unit and associated reflector means in the housing functioning to direct the counter flash about perpendicular to the detected intruder light flash;
   circuitry to minimize false signals from slow rise time flashes in a vehicle traffic environment;
   wherein the flash unit further comprises a plurality of voltage storage devices and voltage charge devices to power the flash unit and comprises a high speed switching network to activate one voltage storage device as soon as a predecessor voltage storage device is triggered, such that when a first voltage storage of the plurality of voltage storage devices discharges its voltage to the flash unit, the high speed switching network switches to another voltage storage device of the plurality of voltage storage devices, while the first voltage storage device is recharged from one or more of the plurality of voltage charge devices; and
   wherein the counter flash covers a target area and over exposes only a limited portion of the intruding camera's field of view.

2. The photo preventer of claim 1, wherein a response time of less than 85 microseconds occurs between the detecting of the intruder light flash and the counter flash.

3. The photo preventer of claim 1, wherein the counter flash further comprises enough light to prevent extraction of a digital image in the target area.

4. The photo preventer of claim 1, wherein the housing further comprises a transparent surface to allow white and infrared light to pass while simultaneously blocking UV light.

5. The photo preventer of claim 1, further comprising a control circuit to provide a low intensity illumination output only mode, a flash detection and flash alert signal mode, and a flash detection, flash alert signal, and counter flash mode.

6. The photo preventer of claim 5, wherein the control circuit provides an adjustable intensity of the counter flash.

7. The photo preventer of claim 1, wherein the intruder light flash detector further comprises circuitry to minimize false signal from DC voltage changes.

8. The photo preventer of claim 1, wherein the housing further comprises an attachment to a vehicle near a license plate, or attachment to a window of a vehicle, or attachment to a window of a structure.

9. The photo preventer of claim 1, wherein the housing further comprises a frame around a vehicle license plate.

10. A photo preventer comprising:
    an intruder camera flash detector having circuitry to filter out repetitive non-camera flashes in a vehicle traffic environment;
    circuitry to minimize false signals from slow rise time flashes in a vehicle traffic environment;
    a power source to charge a high voltage storage device;
    a trigger circuit which receives a signal from the intruder camera flash detector and fires a high voltage storage device;
    wherein said high voltage storage device when fired causes a counter flash generator to fire to over expose only a limited portion of the intruding camera's field of view;
    wherein the counter flash generator further comprises a plurality of voltage storage devices and voltage charge devices to power the counter flash generator and comprises a high speed switching network to activate one voltage storage device as soon as a predecessor voltage storage device is triggered, such that when a first voltage storage of the plurality of voltage storage devices discharges its voltage to the flash unit, the high speed switching network switches to another voltage storage device of the plurality of voltage storage devices, while the first voltage storage device is recharged from one or more of the plurality of voltage charge devices; and wherein the counter flash generator and an associated reflector emits its light substantially perpendicular to the intruder camera flash.

11. The photo preventer of claim 10, further comprising housing with an inlet window transparent to white and infra red light and opaque to UV light.

12. The photo preventer of claim 11 further comprising a control circuit having:
an adjustable power output from the high voltage storage devices; and
a mode for a low intensity illumination output only, a mode for an intruder flash detection and alert signal, and a mode for an intruder flash detection, alert signal, and counter flash generation.

13. A method to prevent a photo of a target area, the method comprising the steps of:
mounting a housing having a flash generator adjacent to the target area;
directing an intruder flash detector having a center of sensing field of view about perpendicular to the target area;
directing a flash generator output about perpendicular to the sensing field of view;
filtering out slow rise time flashes in a vehicle traffic environment;
sensing an intruder flash;
powering the flash generator with one of a plurality of voltage storage devices;
discharging voltage from a first voltage storage device of said plurality of voltage storage devices into said flash generator output;
high speed switching from said first voltage storage device to another voltage storage device, of said plurality of voltage storage devices, to apply it's voltage as soon as the first voltage storage device discharges it's voltage into the flash generator output;
recharging said first voltage storage device with at least one of a plurality of voltage charge devices as soon as the first voltage storage device discharges it's voltage into the flash generator output; and
triggering the flash generator to counter flash a target area and over exposes only a limited portion of the intruding camera's field of view.

14. The method of claim 13 further comprising the step of filtering false flash signals from DC voltage changes from an output of the intruder flash detector.

15. A method to prevent a photo of a target area, the method comprising the steps of:
mounting a housing having a flash generator adjacent to the target area;
directing an intruder flash detector having a center of sensing field of view about perpendicular to the target area;
directing a flash generator output about perpendicular to the sensing field of view;
filtering out slow rise time flashes in a vehicle traffic environment;
filtering out repetitive non-camera flashes in a vehicle traffic environment;
sensing an intruder flash;
powering the flash generator with one of a plurality of voltage storage devices;
discharging voltage from a first voltage storage device of said plurality of voltage storage devices into said flash generator output;
high speed switching from said first voltage storage device to another voltage storage device, of said plurality of voltage storage devices, to apply it's voltage as soon as the first voltage storage device discharges it's voltage into the flash generator output;
recharging said first voltage storage device with at least one of a plurality of voltage charge devices as soon as the first voltage storage device discharges it's voltage into the flash generator output; and
triggering the flash generator to counter flash a target area and over exposes only a limited portion of the intruding camera's field of view.

16. The method of claim 13 further comprising the step of filtering false flash signals from DC voltage changes from an output of the intruder flash detector.

17. The photo preventer of claim 10, wherein a response time of less than 85 microseconds occurs between the detecting of the intruder camera flash and the generation of the counter flash.

18. The method of claim 13, wherein said step of triggering the flash generator comprises the step of triggering the flash generator in under 85 microseconds.

19. The method of claim 18, wherein said step of triggering the flash generator comprises the step of triggering the flash generator in under 85 microseconds.

* * * * *